United States Patent
Chin et al.

(10) Patent No.: US 10,635,252 B1
(45) Date of Patent: Apr. 28, 2020

(54) TOUCH MODULE

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventors: Hung-Chieh Chin, Guangdong (CN); Yueh-Feng Yang, Guangdong (CN); Po-Lin Chen, Guangdong (CN); Yen-Heng Huang, Guangdong (CN); Ju-Xiang Liu, Guangdong (CN)

(73) Assignees: INTERFACE TECHNOLOGY (CHENGDU) CO., LTD., Sichuan (CN); INTERFACE OPTOELECTRONICS (SHENZHEN) CO., LTD., Guangdong (CN); GENERAL INTEFACE SOLUTION LIMITED, Miaoli County (TW)

(*) Notice: Subject to any disclaimer, the term of this patent is extended or adjusted under 35 U.S.C. 154(b) by 0 days.

(21) Appl. No.: 16/281,057

(22) Filed: Feb. 20, 2019

(30) Foreign Application Priority Data

Dec. 25, 2018 (CN) .......................... 2018 1 1589074

(51) Int. Cl.
 *G06F 3/044* (2006.01)
(52) U.S. Cl.
 CPC .... *G06F 3/044* (2013.01); *G06F 2203/04112* (2013.01)

(58) Field of Classification Search
 CPC ...................... G06F 2203/04112; G06F 3/044
 See application file for complete search history.

(56) References Cited

U.S. PATENT DOCUMENTS

| | | | |
|---|---|---|---|
| 2011/0102361 A1* | 5/2011 | Philipp | G06F 3/044 345/174 |
| 2011/0102370 A1* | 5/2011 | Kono | G06F 3/044 345/174 |
| 2015/0177872 A1* | 6/2015 | Kim | G06F 3/044 345/174 |
| 2015/0286323 A1* | 10/2015 | Iwami | G06F 3/041 345/174 |
| 2015/0355751 A1* | 12/2015 | Kurasawa | G06F 3/044 345/174 |
| 2016/0018348 A1* | 1/2016 | Yau | G06F 3/044 324/697 |
| 2017/0010738 A1* | 1/2017 | Kurasawa | G06F 3/0416 |
| 2017/0102804 A1* | 4/2017 | Kikukawa | G06F 3/041 |
| 2019/0258356 A1* | 8/2019 | Ishizaki | G06F 3/0416 |

* cited by examiner

*Primary Examiner* — Dong Hui Liang
(74) *Attorney, Agent, or Firm* — CKC & Partners Co., LLC

(57) ABSTRACT

A touch module includes a substrate and a touch electrode layer. The touch electrode layer is disposed on the substrate. The touch electrode layer includes a plurality of main mesh patterns and a plurality of dummy mesh patterns. The dummy mesh patterns of the touch electrode layer each have a plurality of breakpoints.

8 Claims, 3 Drawing Sheets

TOUCH MODULE

RELATED APPLICATIONS

This application claims priority to China Application Serial Number 201811589074.8, filed Dec. 25, 2018, the disclosure of which is incorporated herein by reference in its entirety.

BACKGROUND

Technical Field

The present disclosure relates to a touch module.

Description of Related Art

In recent years, touchscreens have been widely adopted in electronic devices such as smartphones and tablets. Manufacturing of touchscreens involves developing process, during which chemical reduction of metal meshes in touch electrodes triggered by redundant electrons frequently occurs, resulting in the metal meshes being partially thickened. The issue described above can potentially introduce stripes (i.e., interleaved light and dark areas) onto the touchscreen, and affect user viewing experience accordingly.

SUMMARY

In view of the foregoing, one of the objects of the present disclosure is to provide a touch module having metal meshes with uniform line width.

To achieve the objective stated above, in accordance with an embodiment of the present disclosure, a touch module includes a substrate and a touch electrode layer disposed on the substrate. The touch electrode layer includes a plurality of main mesh patterns and a plurality of dummy mesh patterns. Each of the dummy mesh patterns has a plurality of breakpoints.

In one or more embodiments of the present disclosure, the touch module further includes a plurality of main contact pads and a plurality of dummy contact pads. Each of the main mesh patterns is connected between two of the main contact pads. Each of the dummy mesh patterns is connected between two of the dummy contact pads. Each of the dummy mesh patterns has two continuous regions connected to two of the dummy contact pads respectively. The breakpoints are located outside of the continuous regions.

In one or more embodiments of the present disclosure, the continuous regions and two of the dummy contact pads connected thereto are arranged along a direction.

In one or more embodiments of the present disclosure, the dummy contact pads are ring-shaped.

In one or more embodiments of the present disclosure, the main mesh patterns and the dummy mesh patterns are alternately arranged in a first direction. The dummy mesh patterns extend along a second direction perpendicular to the first direction. The dummy contact pads are located on two ends of the dummy mesh patterns in the second direction.

In one or more embodiments of the present disclosure, the substrate has a display region and a fanout region surrounding the display region. The touch electrode layer covers the display region. The main contact pads and the dummy contact pads are located in the fanout region.

In one or more embodiments of the present disclosure, the touch module further includes a plurality of conductive routes. The conductive routes extend within the fanout region and are connected to the main mesh patterns through the main contact pads.

In one or more embodiments of the present disclosure, each of the dummy mesh patterns includes a plurality of mesh units joined together. Each of the mesh units has a corner. Each of the dummy contact pads is connected to the corner of a corresponding mesh unit.

In one or more embodiments of the present disclosure, portions of the dummy mesh patterns inside the continuous regions have a first line width. Portions of the dummy mesh patterns outside the continuous regions have a second line width. The first line width is greater than the second line width.

In one or more embodiments of the present disclosure, each of the main mesh patterns includes a plurality of mesh units joined together. Each of the mesh units has a corner. The touch module further includes a plurality of conductive routes. Each of the conductive routes is connected to the corner of a corresponding mesh unit. A line width of the main mesh patterns is substantially equal to a line width of the dummy mesh patterns.

In sum, in an embodiment of the present disclosure, the main contact pads are provided at the ends of the main mesh patterns, and the dummy contact pads are also provided at the ends of the dummy mesh patterns. In another embodiment of the present disclosure, both the main contact pads and the dummy contact pads are not incorporated. As such, the main mesh patterns and the dummy mesh patterns are of equal line widths at their ends, and no easily visible stripes would be present at the edges of the display region accordingly.

BRIEF DESCRIPTION OF THE DRAWINGS

To make the objectives, features, advantages, and examples of the present invention, including those mentioned above and others, more comprehensible, descriptions of the accompanying drawings are provided as follows.

DETAILED DESCRIPTION

Figure 1:
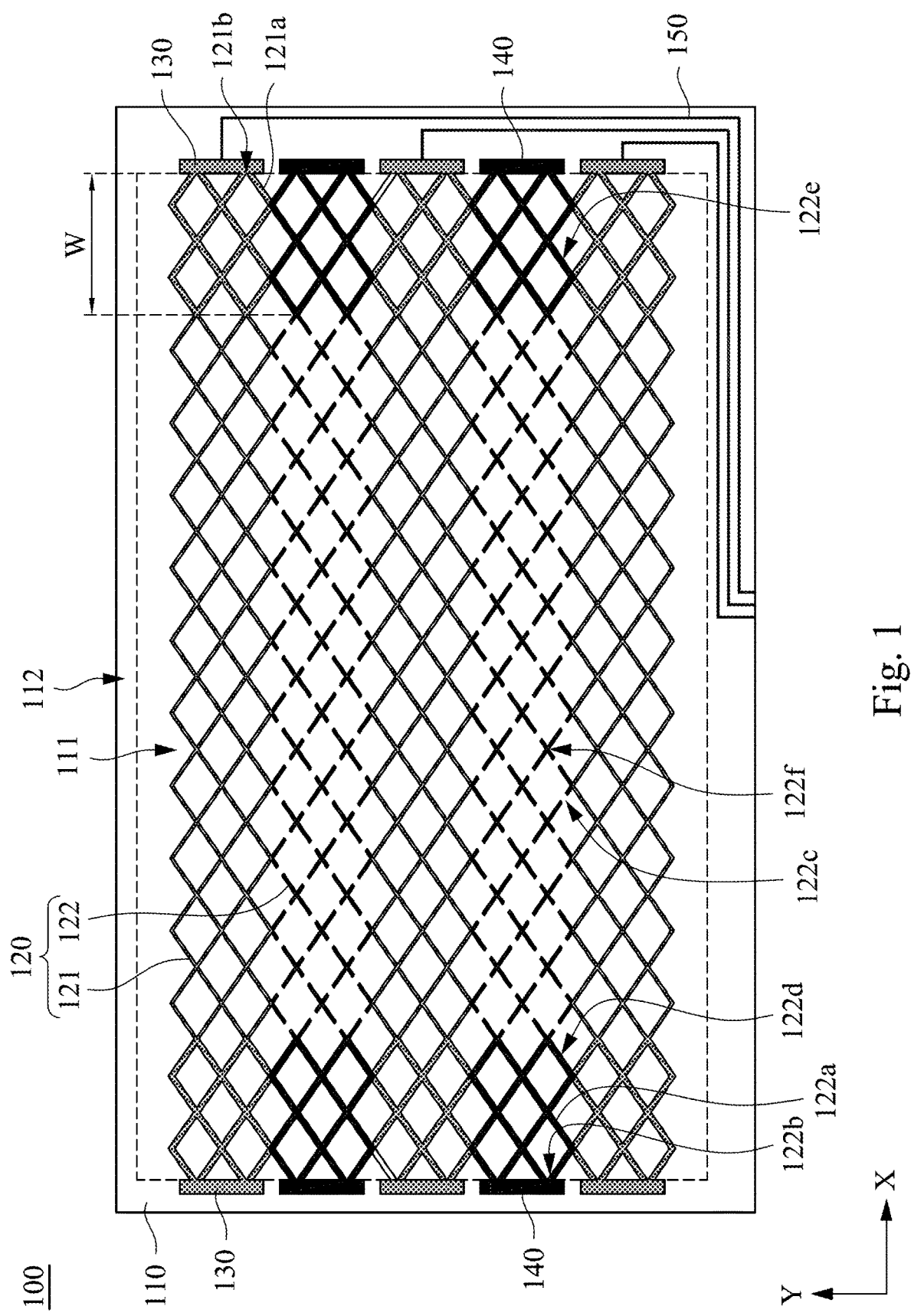
FIG. 1 illustrates a top view of a touch module in accordance with an embodiment of the present disclosure.

For the sake of the completeness of the description of the present disclosure, reference is made to the accompanying drawings and various embodiments described below. Various features in the drawings are not drawn to scale and are provided for illustration purposes only. To provide full understanding of the present disclosure, various practical details will be explained in the following descriptions. However, a person with ordinary skill in relevant art should realize that the present disclosure can be implemented without one or more of the practical details. Therefore, these details should not be used to limit the present disclosure.

Please refer to FIG. 1, which illustrates a top view of a touch module 100 in accordance with an embodiment of the present disclosure. In some embodiments, the touch module 100 may be equipped in electronic devices such as smartphones and tablets to provide touch-based input interface thereto.

As shown in FIG. 1, the touch module 100 includes a substrate 110, a touch electrode layer 120, a plurality of main contact pads 130, and a plurality of dummy contact pads 140. The substrate 110 has a display region 111 and a fanout region 112 surrounding the display region 111. The touch electrode layer 120 is disposed on a top surface of the substrate 110 and covers the display region 111. In some embodiments, the touch module 100 further includes a second touch electrode layer disposed on a bottom surface of the substrate 110. In some embodiments, the second touch electrode layer and the touch electrode layer 120 are both disposed on the top surface of the substrate 110, and the second touch electrode layer and the touch electrode layer 120 are separated by an insulating layer.

As shown in FIG. 1, the touch electrode layer 120 includes a plurality of main mesh patterns 121 and a plurality of dummy mesh patterns 122. The main mesh patterns 121 and the dummy mesh patterns 122 are rectangular-shaped mesh patterns extending along an X direction, and are alternately arranged in a Y direction perpendicular to the X direction. Specifically, the main mesh patterns 121 are arranged with a fixed pitch in the Y direction, and each pair of neighboring main mesh patterns 121 has a gap therebetween. The dummy mesh patterns 122 fill in the gaps between the main mesh patterns 121. The dummy mesh patterns 122 do not have sensing function. The dummy mesh patterns 122 serve to make the touch electrode layer 120 visually uniform, so as to improve the viewing experience.

As shown in FIG. 1, each of the main mesh patterns 121 includes a plurality of diamond-shaped mesh units 121a joined together. Each of the mesh units 121a has four corners 121b that are connected to the corners 121b of neighboring mesh units 121a. In some embodiments, the mesh units 121a are formed with metallic conductive wires.

As shown in FIG. 1, the main contact pads 130 are located in the fanout region 112. Each of the main mesh patterns 121 is connected between two of the main contact pads 130. Specifically, in the X direction, the main contact pads 130 are located on two ends of the main mesh patterns 121, and are connected to the leftmost/rightmost mesh units 121a at the corners 121b thereof. In some embodiments, the main contact pads 130 serve as electrical testing pads, through which external circuits are electrically coupled to the main mesh patterns 121 to perform tests/measurements.

In some embodiments, as shown in FIG. 1, the touch module 100 further includes a plurality of conductive routes 150. The conductive routes 150 extend within the fanout region 112 and are connected to the main mesh patterns 121 through the main contact pads 130. Specifically, in the present embodiment, each of the conductive routes 150 extends along the fanout region 112 and partially surrounds the display region 111. Each of the conductive routes 150 has two opposite ends, including a first end connected to one of the main contact pads 130 that is located on the right side of the corresponding main mesh pattern 121, and a second end positioned at an edge of the substrate 110. In some embodiments, the second ends of the conductive routes 150 are coupled to a control circuit (not shown), which serves to detect sensing signals generated by the main mesh patterns 121.

As shown in FIG. 1, each of the dummy mesh patterns 122 includes a plurality of diamond-shaped mesh units 122a joined together. Each of the mesh units 122a has four corners 122b that are connected to the corners 122b of neighboring mesh units 122a. The dummy contact pads 140 are located in the fanout region 112. Each of the dummy mesh patterns 122 is connected between two of the dummy contact pads 140. Specifically, in the X direction, the dummy contact pads 140 are located on two ends of the dummy mesh patterns 122, and are connected to the leftmost/rightmost mesh units 122a at the corners 122b thereof.

As shown in FIG. 1, each of the dummy mesh patterns 122 has a plurality of breakpoints 122c distributed in a middle portion of the dummy mesh patterns 122. Specifically, each of the dummy mesh patterns 122 has two continuous regions 122d, 122e and a center region 122f located therebetween. The continuous regions 122d, 122e are located on the two ends of the corresponding dummy mesh pattern 122 and are connected to two corresponding dummy contact pads 140 respectively. The breakpoints 122c are located outside of the continuous regions 122d, 122e. In other words, the breakpoints 122c are distributed in the center region 122f. In some embodiments, in the X direction, the continuous regions 122d, 122e are of equal width W, and the width W is substantially equal to 2 mm.

During the developing process, the fanout region 112 develops faster than the display region 111 due to the loading effect. Consequently, redundant electrons in the fanout region 112 flow into the display region 111, thickening meshes in the left-end/right-end portion of the touch electrode layer 120 adjacent to the fanout region 112.

Being attracted by the main contact pads 130, the redundant electrons in the fanout region 112 enter the main contact pads 130, and further flow into the main mesh patterns 121, which are connected to the main contact pads 130. The electrons entering the main mesh patterns 121 cause chemical reduction (e.g., reducing $Ag^+$ to Ag), which thickens meshes on both ends of the main mesh patterns 121 (as shown in FIG. 1).

The redundant electrons in the fanout region 112 may also be attracted by the dummy contact pads 140. The redundant electrons enter the dummy contact pads 140, and further flow into the dummy mesh patterns 122, which are connected to the dummy contact pads 140. The electrons entering the dummy mesh patterns 122 cause chemical reduction, which thickens meshes on both ends of the dummy mesh patterns 122. Specifically, after the developing process, a line width of portions of the dummy mesh patterns 122 inside the continuous regions 122d, 122e is greater than a line width of portions of the dummy mesh patterns 122 inside the center region 122f.

A uniform increase in line width within portions of the main mesh patterns 121 and the dummy mesh patterns 122 adjacent to the fanout region 112 avoids stripes (i.e., interleaved light and dark areas) at the edges of the display region 111. In addition, due to the fact that the center region 122f is separated from the continuous regions 122d, 122e (by the breakpoints 122c), the redundant electrons cannot enter the center region 122f. Therefore, the line width of portions of the dummy mesh patterns 122 inside the center region 122f remains substantially unchanged after the developing process.

Figure 2:
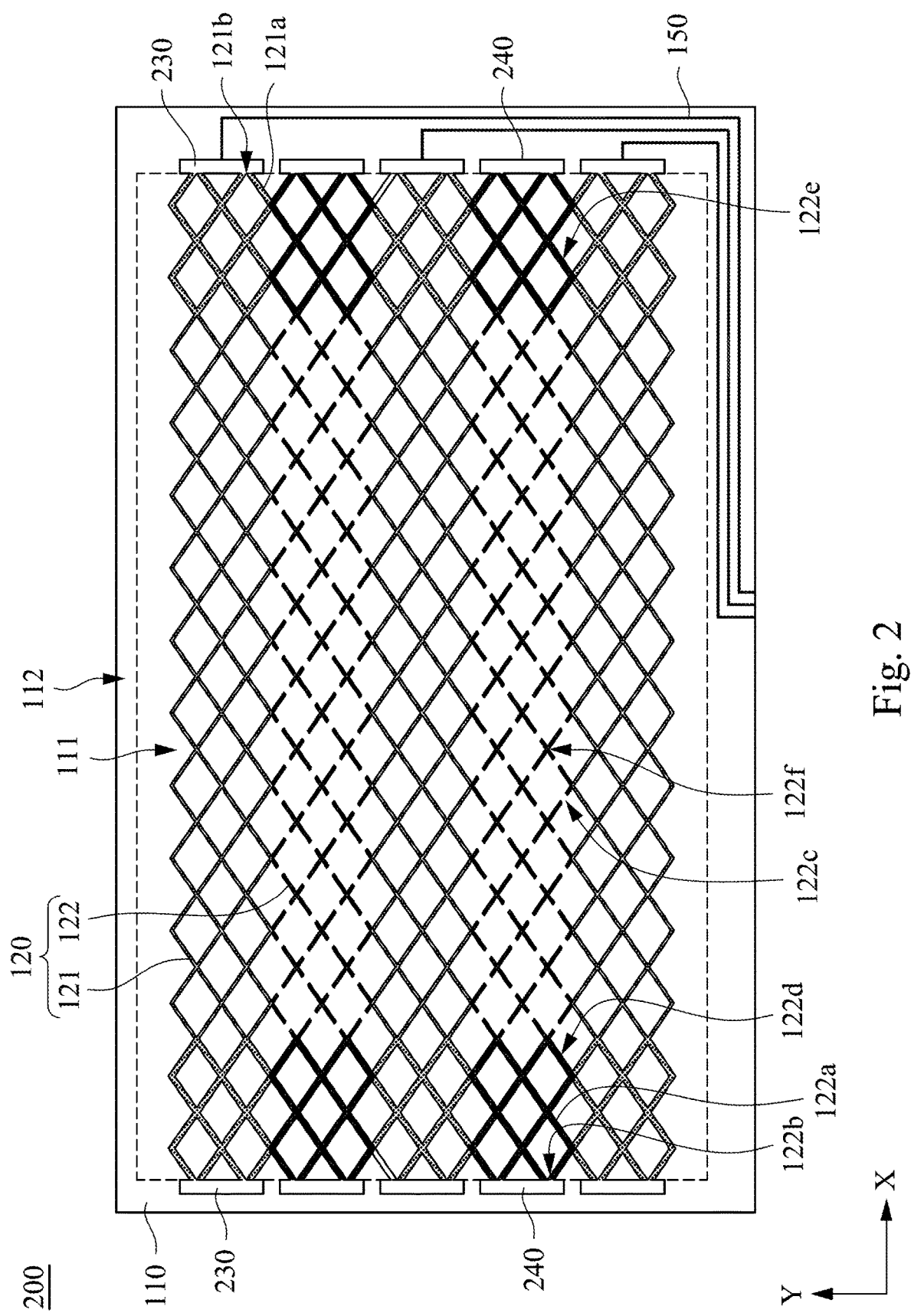
FIG. 2 illustrates a top view of a touch module in accordance with another embodiment of the present disclosure.

Please refer to FIG. 2, which illustrates a top view of a touch module 200 in accordance with another embodiment of the present disclosure. A difference between the touch module 200 and the embodiment shown in FIG. 1 (i.e., the touch module 100) is that the main contact pads 130 and the dummy contact pads 140, both being solid contact pads, are replaced with main contact pads 230 and dummy contact pads 240, which are hollow contact pads.

As shown in FIG. 2, the main contact pads 230 and the dummy contact pads 240 are substantially ring-shaped. Specifically, in the present embodiment, the main contact pads 230 and the dummy contact pads 240 are hollow contact pads with a substantially rectangular shape. Each of the main contact pads 230 has a first edge facing a corresponding main mesh pattern 121 and a second edge away from the corresponding main mesh pattern 121. The first edge is connected to the corners 121b of the corresponding main mesh pattern 121. The second edge is connected to the corresponding conductive route 150. Each of the dummy contact pads 240 has a third edge facing a corresponding dummy mesh pattern 122. The third edge is connected to the corners 122b of the corresponding dummy mesh pattern 122.

As shown in FIG. 1, all of the main contact pads 130 and all of the dummy contact pads 140 are solid contact pads. As shown in FIG. 2, all of the main contact pads 230 and all of the dummy contact pads 240 are hollow contact pads. The present disclosure is not limited to such configurations. In some embodiments, both solid contact pads (e.g., the main contact pads 130 and the dummy contact pads 140) and hollow contact pads (e.g., the main contact pads 230 and the dummy contact pads 240) may be incorporated into the same touch module.

Figure 3:
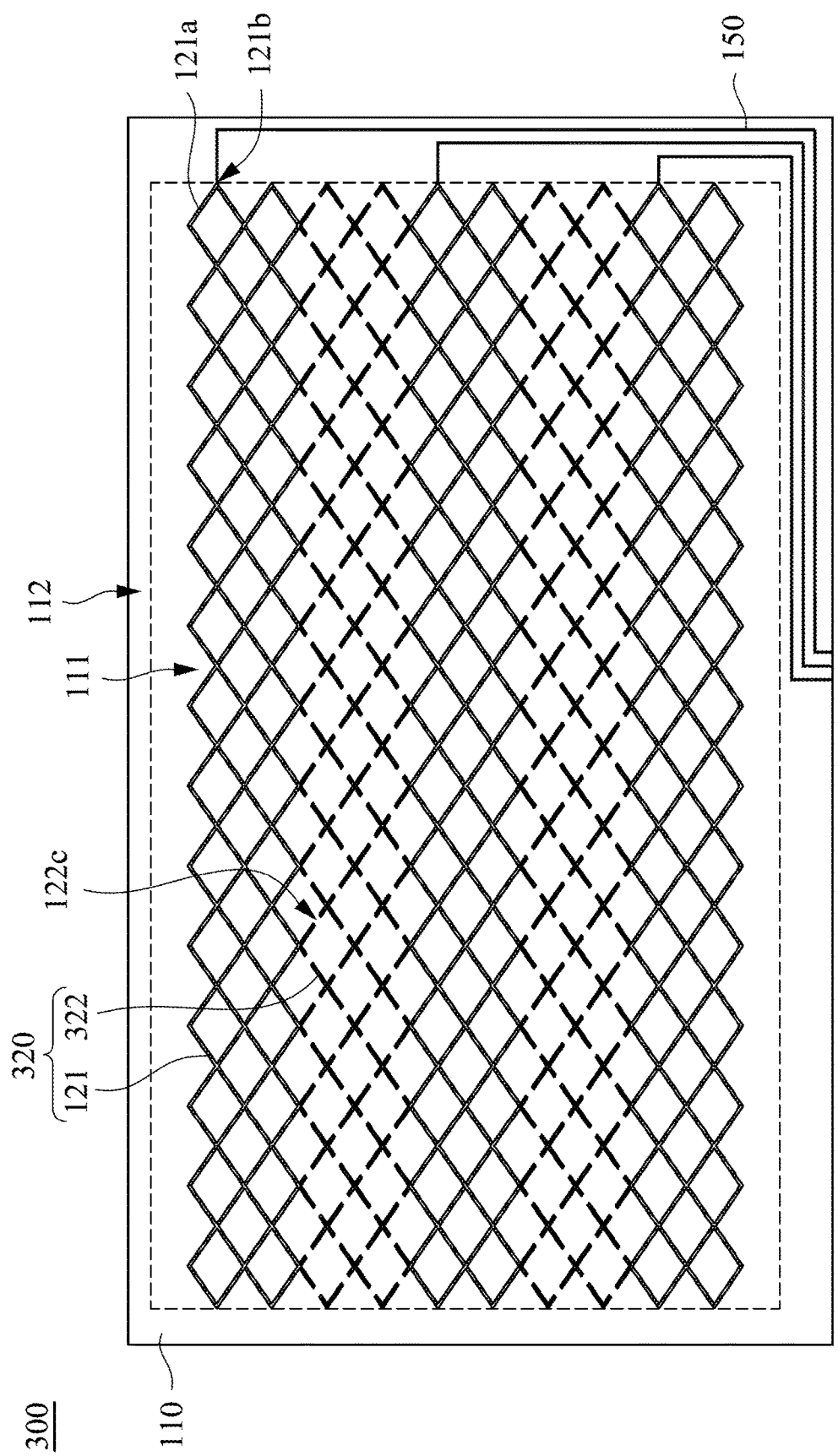
FIG. 3 illustrates a top view of a touch module in accordance with another embodiment of the present disclosure.

Please refer to FIG. 3, which illustrates a top view of a touch module 300 in accordance with another embodiment of the present disclosure. The touch module 300 includes a substrate 110, a touch electrode layer 320, and a plurality of conductive routes 150. The touch electrode layer 320 includes a plurality of main mesh patterns 121 and a plurality of dummy mesh patterns 322.

A difference between the touch module 300 and the embodiment shown in FIG. 1 (i.e., the touch module 100) is that the touch module 300 does not incorporate the main contact pads 130 and the dummy contact pads 140, and the conductive routes 150 are connected to the main mesh patterns 121 at the corners 121b of the rightmost mesh units 121a. Another difference between the touch module 300 and the embodiment shown in FIG. 1 is that the dummy mesh patterns 122 are replaced with the dummy mesh patterns 322.

As opposed to the dummy mesh patterns 122, the dummy mesh patterns 322 have no continuous region. Therefore, the breakpoints 122c are distributed over the entire dummy mesh patterns 322. The absence of the main contact pads 130 and the dummy contact pads 140 makes it harder for the redundant electrons in the fanout region 112 to enter the touch electrode layer 320. As a result, both the line width of the main mesh patterns 121 and that of the dummy mesh patterns 322 remain substantially unchanged after the developing process, and the line widths of the main mesh patterns 121 and the dummy mesh patterns 322 are substantially equal. Thus, no easily visible stripes would be present at the edges of the display region 111.

In sum, in an embodiment of the present disclosure, the main contact pads are provided at the ends of the main mesh patterns, and the dummy contact pads are also provided at the ends of the dummy mesh patterns. In another embodiment of the present disclosure, both the main contact pads and the dummy contact pads are not incorporated. As such, the main mesh patterns and the dummy mesh patterns are of equal line widths at their ends, and no easily visible stripes would be present at the edges of the display region accordingly.

Although the present disclosure has been described by way of the exemplary embodiments, the present disclosure is not limited thereto. Any person skilled in the art can make various changes and modifications without departing from the spirit and the scope of the present disclosure. Therefore, the protective scope of the present disclosure shall be the scope of the claims as attached.

What is claimed is:

1. A touch module, comprising:
   a substrate;
   a touch electrode layer disposed on the substrate and comprising:
   a plurality of main mesh patterns; and
   a plurality of dummy mesh patterns, each having a plurality of breakpoints;
   a plurality of main contact pads, wherein each of the main mesh patterns is connected between two of the main contact pads; and
   a plurality of dummy contact pads, wherein each of the dummy mesh patterns is connected between two of the dummy contact pads,
   wherein each of the dummy mesh patterns has two continuous regions connected to two of the dummy contact pads respectively, and the breakpoints are located outside of the continuous regions.

2. The touch module of claim 1, wherein the substrate has a display region and a fanout region surrounding the display region, the touch electrode layer covers the display region, and the main contact pads and the dummy contact pads are located in the fanout region.

3. The touch module of claim 2, further comprising a plurality of conductive routes extending within the fanout region and connected to the main mesh patterns through the main contact pads.

4. The touch module of claim 1, wherein the continuous regions and two of the dummy contact pads connected thereto are arranged along a direction.

5. The touch module of claim 1, wherein the dummy contact pads are ring-shaped.

6. The touch module of claim 1, wherein the main mesh patterns and the dummy mesh patterns are alternately arranged in a first direction, the dummy mesh patterns extend along a second direction perpendicular to the first direction, and the dummy contact pads are located on two ends of the dummy mesh patterns in the second direction.

7. The touch module of claim 1, wherein each of the dummy mesh patterns comprises a plurality of mesh units joined together, each of the mesh units has a corner, and each of the dummy contact pads is connected to the corner of a corresponding one of the mesh units.

8. The touch module of claim 1, wherein portions of the dummy mesh patterns inside the continuous regions have a first line width, portions of the dummy mesh patterns outside the continuous regions have a second line width, and the first line width is greater than the second line width.

* * * * *